United States Patent
Featherstone

(10) Patent No.: US 11,936,527 B2
(45) Date of Patent: Mar. 19, 2024

(54) MULTI-ACCESS EDGE COMPUTING (MEC)

(71) Applicant: Samsung Electronics Co., Ltd., Gyeonggi-do (KR)

(72) Inventor: Walter Featherstone, Middlesex (GB)

(73) Assignee: Samsung Electronics Co., Ltd (KR)

( * ) Notice: Subject to any disclaimer, the term of this patent is extended or adjusted under 35 U.S.C. 154(b) by 85 days.

(21) Appl. No.: 17/833,141

(22) Filed: Jun. 6, 2022

(65) Prior Publication Data
US 2022/0393944 A1    Dec. 8, 2022

(30) Foreign Application Priority Data

Jun. 8, 2021 (GB) ..................... 2108192

(51) Int. Cl.
*H04L 41/0893* (2022.01)
*H04L 41/0895* (2022.01)
*H04W 76/18* (2018.01)

(52) U.S. Cl.
CPC ...... *H04L 41/0893* (2013.01); *H04L 41/0895* (2022.05); *H04W 76/18* (2018.02)

(58) Field of Classification Search
CPC ............................ H04L 41/0893; H04W 76/18
See application file for complete search history.

(56) References Cited

U.S. PATENT DOCUMENTS

| | | | | |
|---|---|---|---|---|
| 2019/0319868 A1* | 10/2019 | Svennebring | ......... | H04L 41/147 |
| 2020/0228880 A1* | 7/2020 | Iyer | ................. | H04N 21/23424 |
| 2021/0099905 A1 | 4/2021 | Huang et al. | | |
| 2021/0203715 A1 | 7/2021 | Han et al. | | |
| 2021/0243580 A1* | 8/2021 | Wang | ................... | H04L 41/044 |

FOREIGN PATENT DOCUMENTS

| | | |
|---|---|---|
| CN | 110647403 | 1/2020 |
| CN | 111913723 | 11/2020 |

(Continued)

OTHER PUBLICATIONS

ETSI GS MEC 010-2 V2.1.1 (Nov. 2019), Multi-access Edge Computing (MEC); MEC Management; Part 2: Application lifecycle, rules and requirements management, pp. 134.

(Continued)

*Primary Examiner* — Viet D Vu
(74) *Attorney, Agent, or Firm* — The Farrell Law Firm, P.C.

(57) ABSTRACT

Disclosed is a method for managing an application instance by a multi-access edge computing orchestrator (MEO) in a multi-access edge computing (MEC) system in a 5G or 6G communication system for supporting a higher data transmission rate, with the method including receiving, from an operational support system (OSS), an application instantiation request including a completion timer in which to finish the instantiation request; selecting at least one MEC platform manager (MEPM) for requesting the application instantiation; transmitting, to the selected MEPM, the application instantiation request; and transmitting, to the OSS, a response indicating that the application instantiation has failed, in case that the completion timer expires before receiving a configuration response from the selected MEPM.

14 Claims, 8 Drawing Sheets

(56) References Cited

FOREIGN PATENT DOCUMENTS

WO    WO 2019/223496    11/2019
WO    WO 2020/192598    10/2020

OTHER PUBLICATIONS

ETSI GS MEC 011 V2.2.1, Multi-Access Edge Computing (MEC), Edge Platform Application Enablement, Dec. 2020, 78 pages.
International Search Report dated Aug. 31, 2022 issued in counterpart application No. PCT/KR2022/007657, 9 pages.
British Office Action dated Nov. 12, 2021 issued in counterpart application No. 2108192.2, 7 pages.
British Intention to Grant dated Aug. 4, 2023 issued in counterpart application No. GB2108192.2, pages.
British Notification of Grant Report dated Sep. 19, 2023 issued in counterpart application No. GB2108192.2, 2 pages.

* cited by examiner

MULTI-ACCESS EDGE COMPUTING (MEC)

CROSS-REFERENCE TO RELATED APPLICATION(S)

This application is based on and claims priority under 35 U.S.C. § 119 to GB Patent Application No. 2108192.2, which was filed on Jun. 8, 2021, the entire disclosure of which is incorporated herein by reference.

BACKGROUND

1. Field

The disclosure relates generally to multi-access edge computing (MEC) and improvements in relation to lifecycle management of applications associated therewith.

2. Related Art $5^{th}$ generation (5G) mobile communication technologies define broad frequency bands such that high transmission rates and new services are possible, and can be implemented not only in sub-6 GHz bands such as 3.5 GHz, but also in above-6 GHz bands referred to as mmWave including 28 GHz and 39 GHz. In addition, it has been considered to implement $6^{th}$ generation (6G) mobile communication technologies (referred to as Beyond 5G systems) in terahertz bands (for example, 95 GHz to 3 THz bands) in order to accomplish transmission rates that are fifty times faster than 5G mobile communication technologies and ultra-low latencies one-tenth of 5G mobile communication technologies.

Since the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multiple input, multiple output (MIMO) for mitigating radio-wave path loss and increasing radio-wave transmission distances in mmWave, supporting numerologies (e.g., operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, level two (L2) pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR UE Power Saving, non-terrestrial network (NTN) which is user equipment (UE)-satellite direct communication for providing coverage in an area in which communication with terrestrial networks is unavailable, and positioning.

Moreover, there has been ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining network functions virtualization (NFV) and software-defined networking (SDN) technologies, and MEC for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, meta-material-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

MEC is governed by standards controlled by the European Telecommunications Standards Institute (ETSI), who have defined a set of specifications to facilitate the creation of an IT service environment at the edge of the network. In the context of the present application, edge of the network means that applications are run closer to the customer (typically a cellular phone customer), so that network congestion is reduced and applications perform better.

FIG. 1 shows a conventional MEC System Reference Architecture. The current MEC specification defines application programming interfaces (APIs) for application lifecycle, rules and requirements management over Mm1 and Mm3 reference points. In conventional MEC architecture, as shown in FIG. 1, the Mm1 reference point is between the operational support systems (OSS) 10 and the MEC orchestrator (MEO) 20. The Mm3 reference point is between the MEO 20 and an MEC platform manager (MEPM) 30.

FIG. 2 shows a conventional multi-access edge system reference architecture variant for MEC in NFV. As shown in FIG. 2, there is also a conventional MEC in an NFV variant of the architecture, where the orchestration is split between the MEO 120 and NFV orchestrator (NFVO) 122, resulting in modifications to the Mm3 reference point (Mm3*) and a new reference point between the MEO 120 (which is evolved to the MEC Application Orchestrator: MEAO) and NFVO 122 (Mv1).

Furthermore, there is an architecture variant that enables MEC systems to be federated.

FIG. 3 shows a conventional multi-access edge system reference architecture variant for MEC federation. The conventional multi-access edge system reference architecture variant for MEC federation shown in FIG. 3 allows shared usage of MEC services and applications. The APIs defined for these reference points provide procedures to onboard MEC application packages and then trigger instantiation and the termination of onboarded applications into the MEC system. In the case of an MEC federation, actions such as application onboarding and instantiation may be initiated from a different MEC system within the federation via the Mfm-fed reference point. The aforementioned application package contains of a set of files (detailed in the manifest file) provided by application provider necessary for application instantiation. Within the package, information is provided that describes the application. This includes its requirements (e.g., a central processing unit (CPU), a memory, storage, key performance indicators (KPIs)), release date, vendor information, provided services and required & optional services. The package also includes a software image (e.g., virtual machine (VM) image) of the application, or a URI to a software image.

The OSS 210 provides a high-level decision to onboard applications of those applications that are to be instantiated. However, it is the MEO 220 that is responsible for ensuring application instances are available at appropriate locations as required. Within the MEC system there may be multiple MEC host locations 230, each with the capability of hosting MEC application instances. Therefore, in response to an application instantiation request from the OSS 210 sent via the Mm1 reference point, the MEO 220 must select the appropriate MEC host 230, or hosts, to instantiate instances of the application. This decision may be based on constraints such as MEC host offered latency, location, available resources and available services. In order to make this decision, the MEO 220 is therefore expected to maintain an overall view of the MEC system based on deployed MEC hosts 230, available resources, available MEC services and topology, all of which may be variable in nature.

In the MEC system hierarchical architecture, where operations are cascaded down between functional entities, the initiating entity (client) should be able to gain insight into the progress of ongoing operations (at the serving entity) and provide requirements on the timeliness in which they are performed. The hierarchical architecture means that a server to a client higher in the hierarchy becomes a client to a server lower in the hierarchy.

SUMMARY

Providing such progress insight to clients and timeliness requirements on servers is an issue addressed by embodiments of the present disclosure, whereby clients are able to make more informed lifecycle management decision and servers can be better informed on how to handle client application lifecycle management based requests.

An edge service provider (ESP) of the MEC system may not be the wireless communications service provider, e.g., the public land mobile network operator (MNO). Typically, the MNO is responsible for the OSS, whilst the ESP would be responsible for the MEO. There are also scenarios where the MNO is responsible for providing the MEC hosting environment(s) (where application instances are hosted) and associated management and orchestration entities, whilst allowing interactions from a third-party OSS. Therefore, there is a further requirement for enabling the OSS to receive application LCM operation insight and provide guidance for such operations in a standardized manner when interacting with the MEO/MEAO/NFVO.

Accordingly, the present disclosure provides a method and an apparatus capable of satisfying the requirements for the OSS and has been made to address at least the above-mentioned problems and/or disadvantages and to provide at least the advantages described below.

According to an aspect of the present disclosure, there is provided a method of managing an application instance by an MEO in an MEC system, with the method including receiving, from an operational support system (OSS), an application instantiation request including a completion timer in which to finish the application instantiation request; selecting at least one MEC platform manager (MEPM) for the application instantiation request; transmitting, to the selected MEPM, the application instantiation request; and transmitting, to the OSS, a response indicating that application instantiation has failed, in case that the completion timer expires before receiving a configuration response from the selected MEPM.

According to another aspect of the present disclosure, provided is an MEO for managing an application instance in an MEC system, the MEO including a transceiver configured to transmit and receive a signal or a message; a memory; and at least one processor that is configured to receive, from an OSS, an application instantiation request including a completion timer in which to finish the application instantiation request; select at least one MEPM for the application instantiation request; transmit, to the selected MEPM, the application instantiation request; and transmit, to the OSS, a response indicating that application instantiation has failed, in case that the completion timer expires before receiving a configuration response from the selected MEPM.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
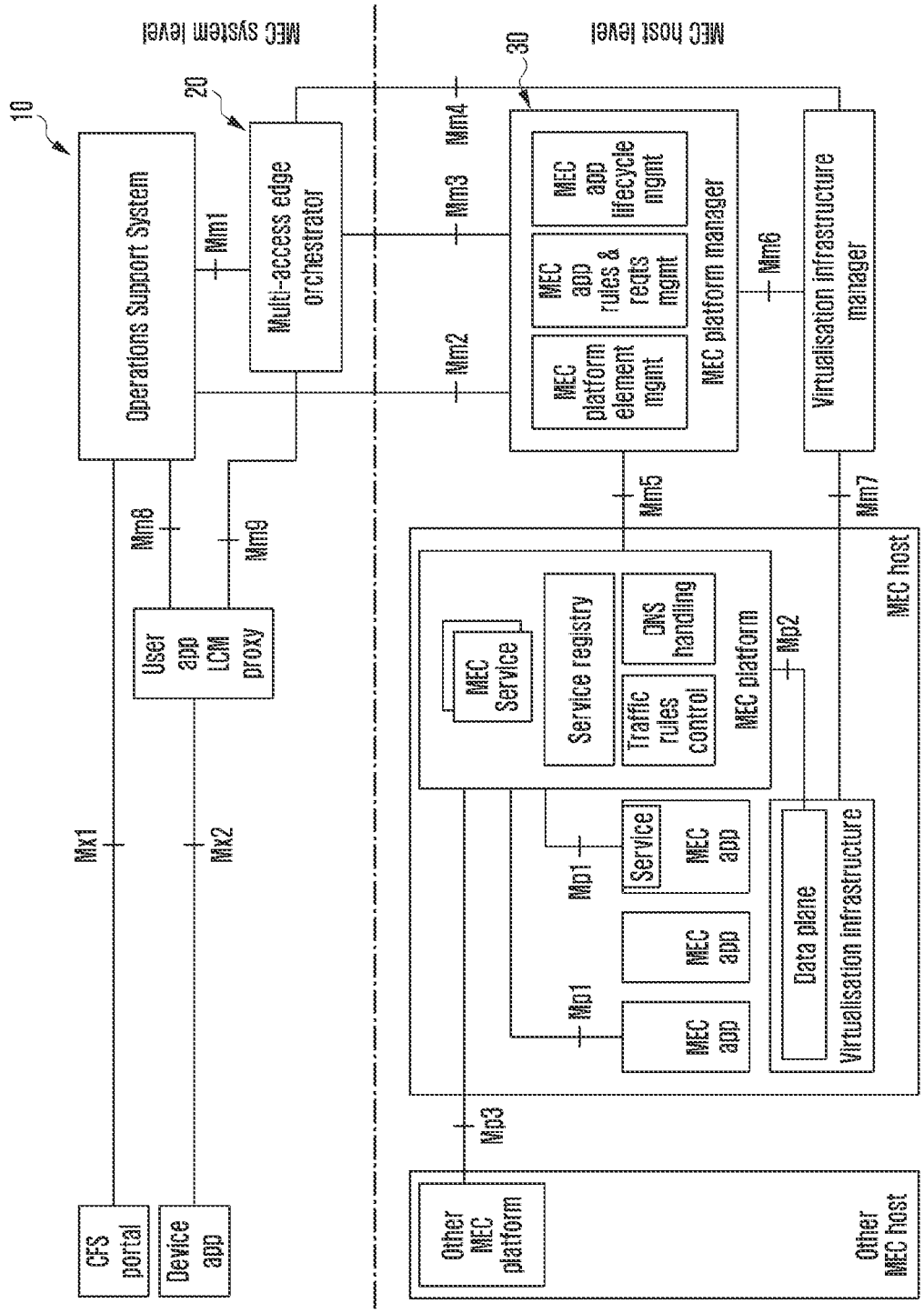
FIG. 1 shows a conventional MEC System Reference Architecture.
Figure 2:
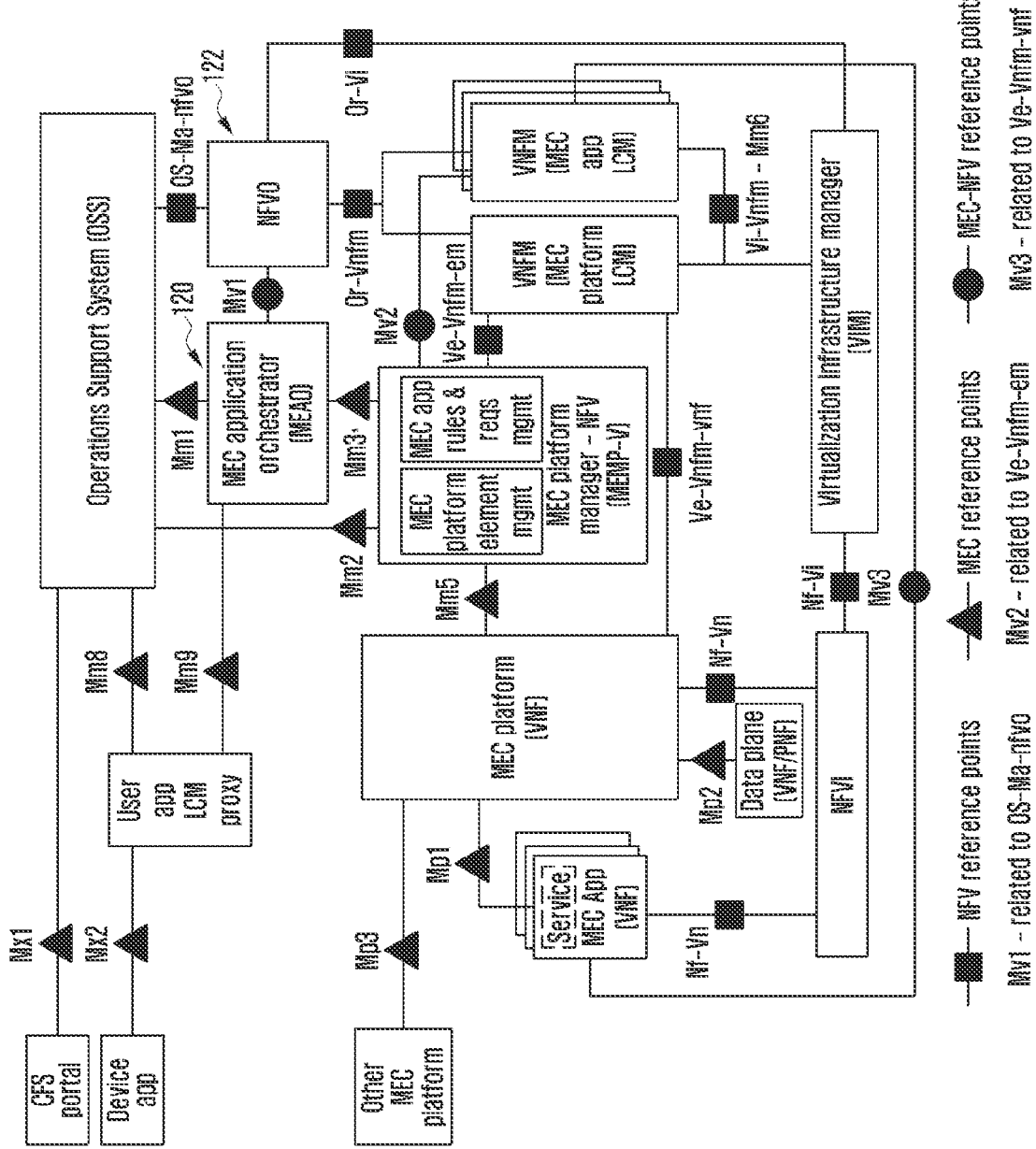
FIG. 2 shows a conventional multi-access edge system reference architecture variant for MEC in NFV.
Figure 3:
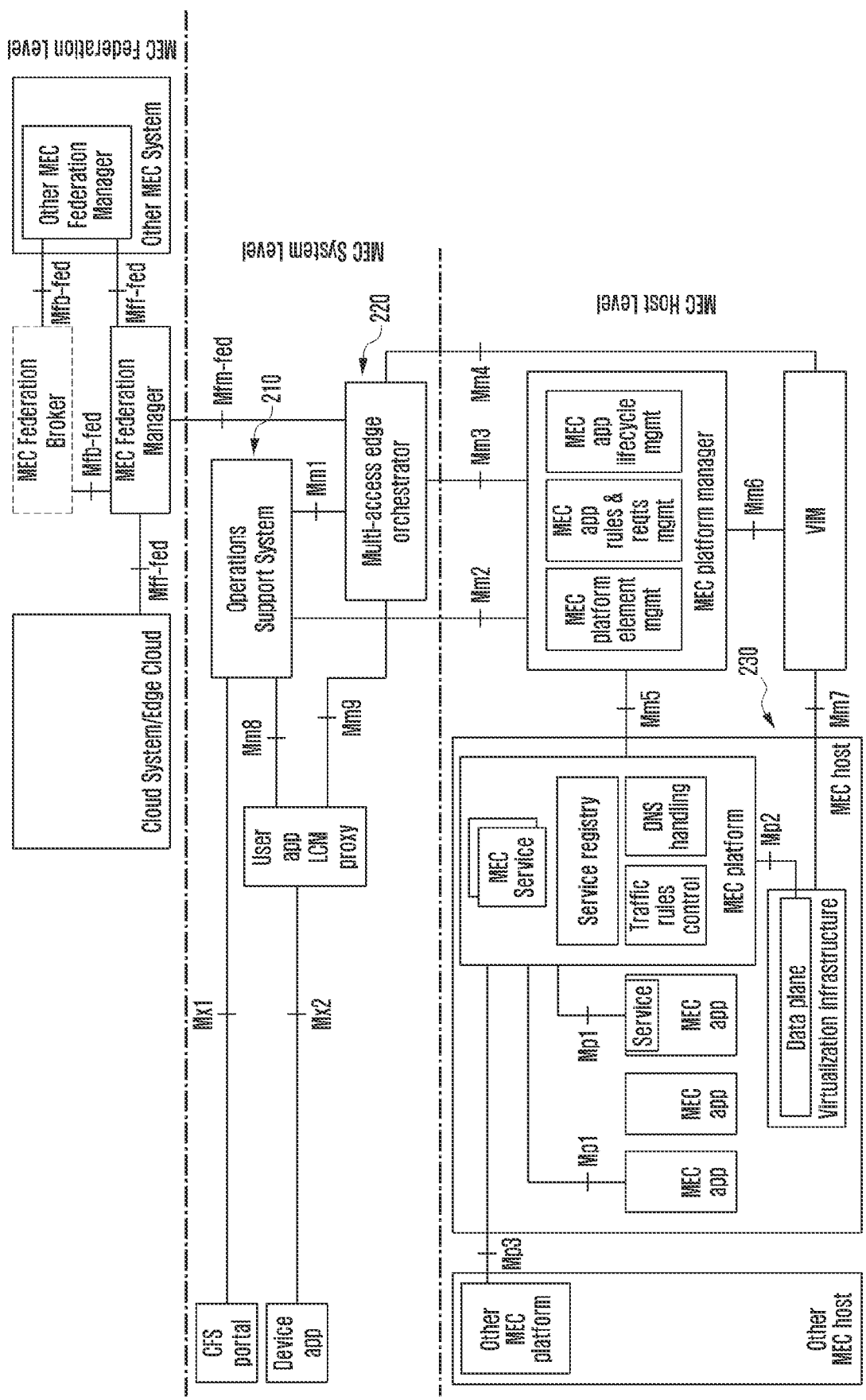
FIG. 3 shows a conventional multi-access edge system reference architecture variant for MEC federation.

Hereinafter, the operation principle of the present disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

Figure 4:
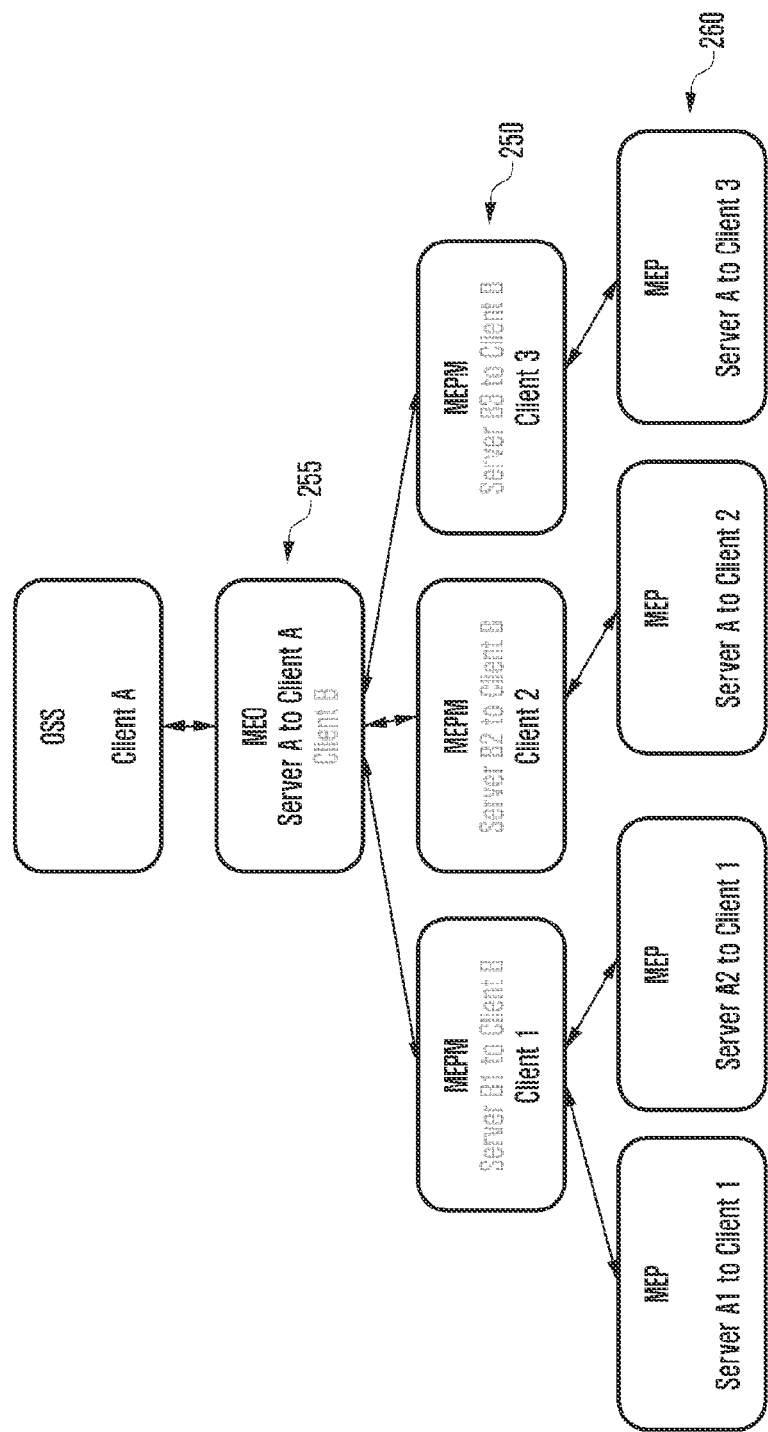
FIG. 4 shows an example of MEC system hierarchy according to an embodiment of the present disclosure.

FIG. 4 shows an example of an MEC system hierarchy according to an embodiment of the present disclosure. FIG. 4 illustrates how a server to a client higher in the hierarchy becomes a client to a server lower in the hierarchy. In the example of FIG. 4, MEPM 250 is a server to MEO 255 and, at the same time, a client of MEP 260. Similar relationships exist for the other entities shown in FIG. 4.

Figure 5:
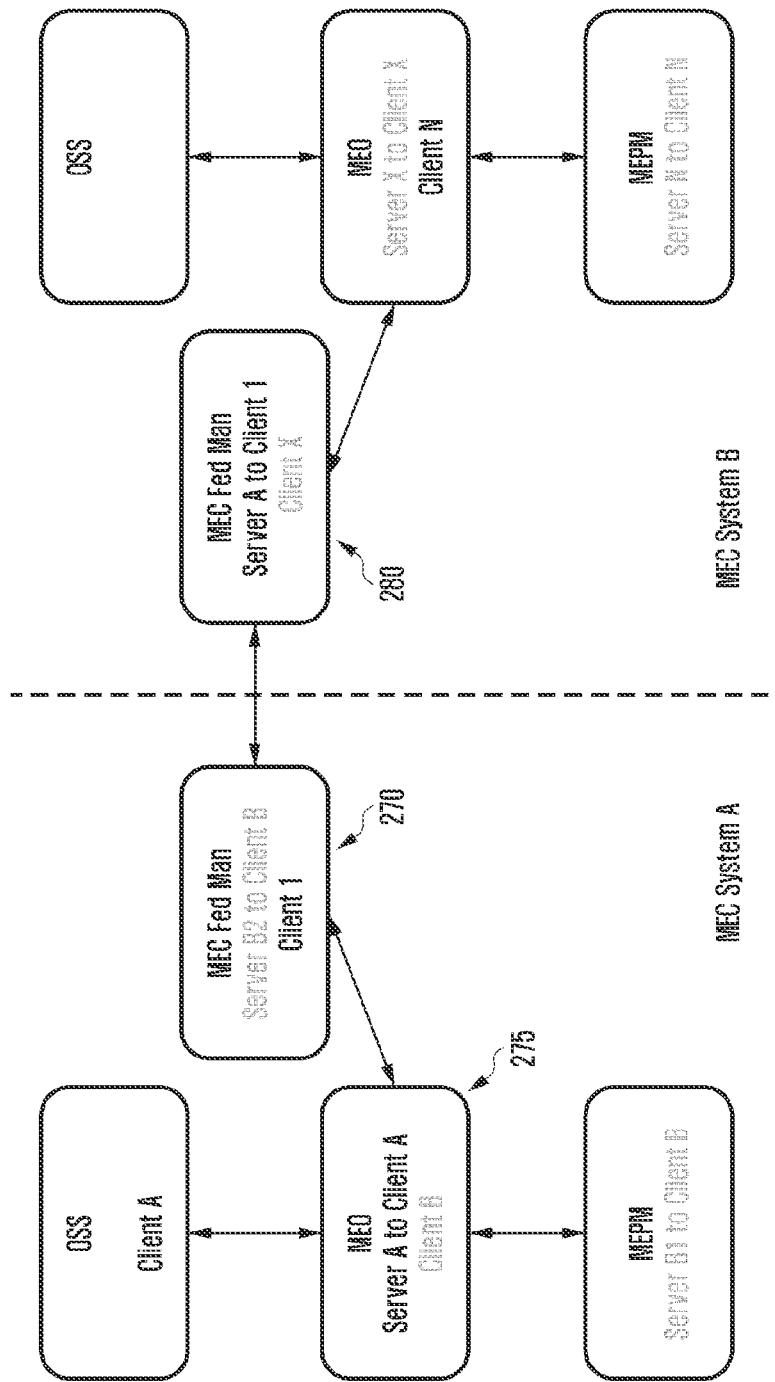
FIG. 5 shows an example of federated MEC system hierarchy according to an embodiment of the present disclosure.

FIG. 5 shows an example of a federated MEC system hierarchy according to an embodiment of the present disclosure. FIG. 5 shows similar relationships to those shown in FIG. 4 exist, but in the context of a federated system. Here, MEC Federation manager 270 is a server to MEO 275 and, at the same time, a client of MEC Federation manager 280. Note that MEC Federation manager 270 is in a first MEC System (A) and MEC Federation manager 280 is in a second MEC System (B). Note also that similar relationships exist for the other entities shown in FIG. 5.

Figure 6:
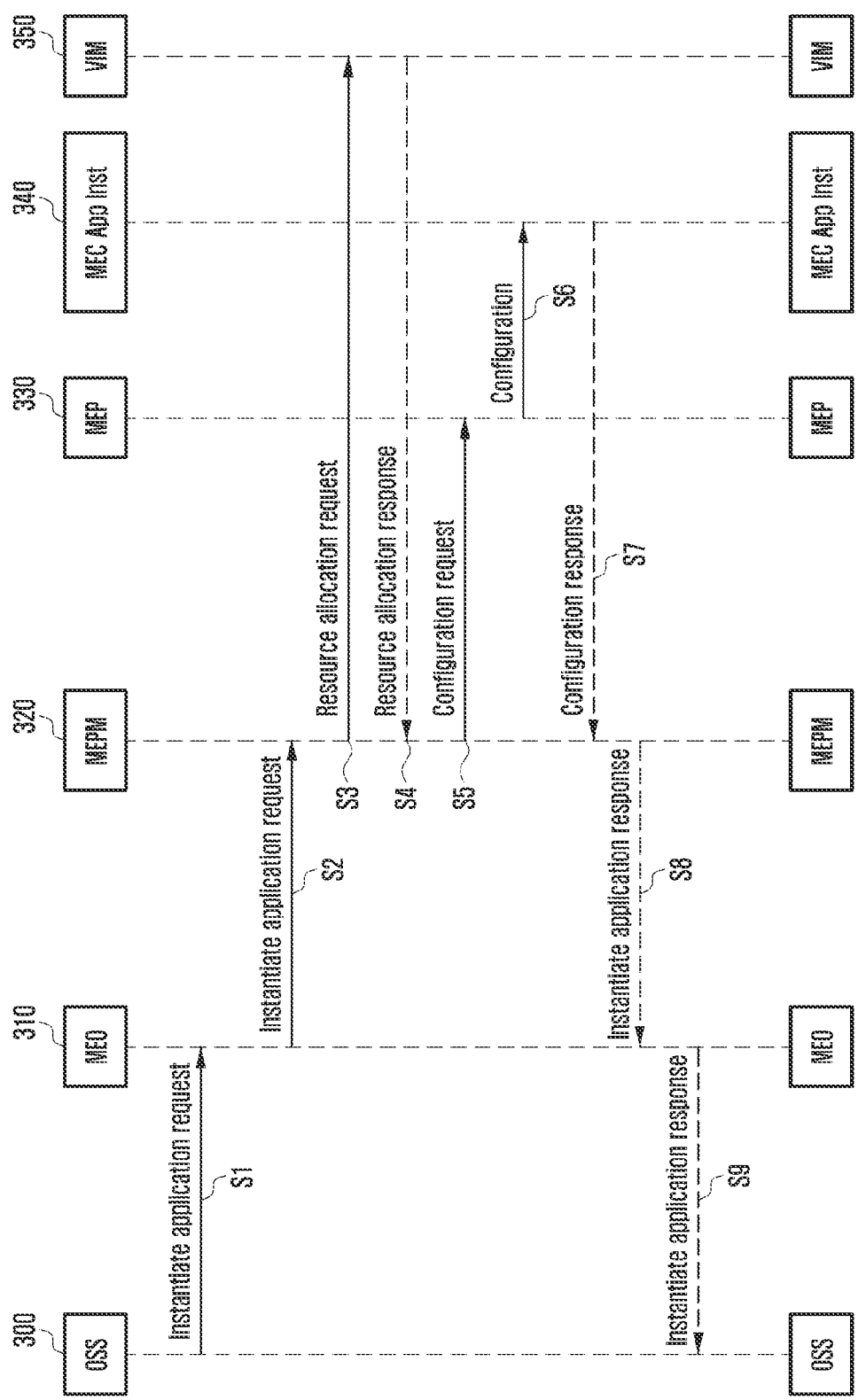
FIG. 6 shows a conventional application instantiation flow.

FIG. 6 shows a conventional application instantiation flow. The conventional application instantiation flow depicted in FIG. 6 highlights that application instantiation requests are sent (S1) from the OSS 300 to the MEO 310, which then selects the MEPMs 320 to instantiate (S2) application instances at their associated MEC hosts. Specifically, the MEPM 320 sends a resource allocation request (S3) to the virtualization infrastructure manager (VIM) 350, with the requested resource including compute, storage, and network resources. Application image information (e.g., a link to the image or an ID of the application image) are also included in the request. The VIM 350 allocates the resources according to the request, and then loads the virtual machine with the application image and runs the VM and the application instance 340. If the operations are successfully executed, the VIM 350 will send a resource allocation response (S4) to the MEPM 320. The MEPM 320 also sends a configuration request (S5) for the application to the MEC platform (MEP) 330, including aspects such as the traffic rules to be configured, DNS rules to be configured, required services and optional services, and services produced by the application instance 340. The MEP 330 then configures the MEC Application Instance 340 (S6). If successful, the MEC Application Instance 340 responds to the MEPM 320 (S7) and this information is then forwarded to the MEO 310 (S8) and onto the OSS 300 (S9).

Figure 7:
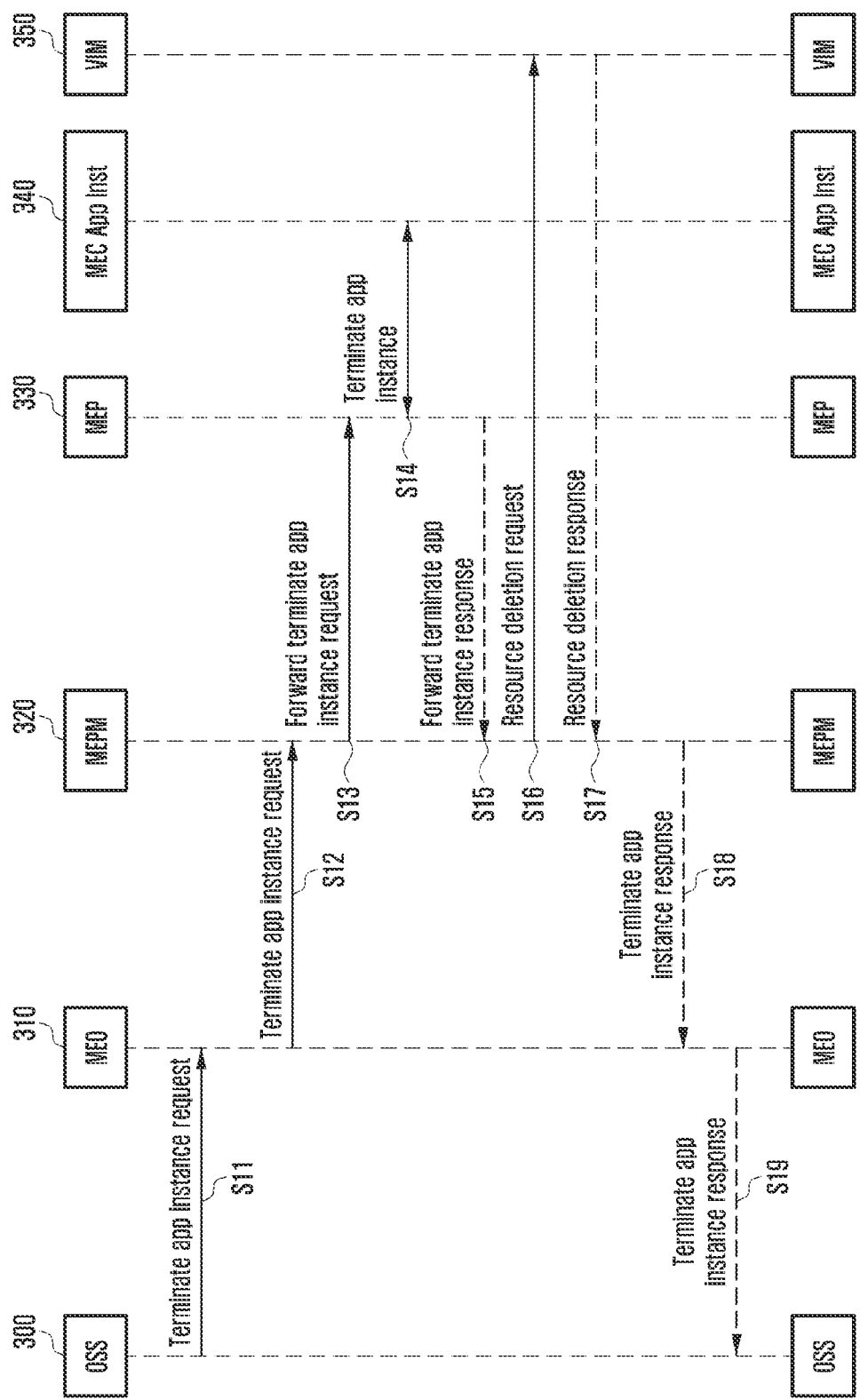
FIG. 7 shows a conventional application termination flow.

FIG. 7 shows a conventional application termination flow. The application termination flow illustrated in FIG. 7 in the same system as shown in FIG. 6, with steps S11-S19 of FIG. 7 and broadly correspond to the steps shown in FIG. 6. However, the result in the termination of an application instance varies. Thus, additional resources are made available at the MEC host, rather than being consumed, since an application which was running is no longer running, and the resources it was consuming are then made available for other applications to use.

Insofar as the flows shown in FIGS. 1-3, 5 and 6 are conventional, the skilled person will readily understand them. Embodiments of the present disclosure adapt certain features of these flows to address the deficiencies discussed previously and to provide additional benefits.

Embodiments of the present disclosure provide that additional information is sent in the application instantiation request (S1, FIG. 6) sent by the OSS 300 to the MEO 310 and from the MEO 310 to each individual MEPM 320 to provide the MEO 310 and MEPM(s) 320 with a completion timer in which to finish the instantiation request. Essentially, the flow of FIG. 6 is adapted such that the message S1 includes additional information regarding the completion timer and this information is propagated as required to the various entities involved.

Bearing in mind that there may be multiple MEPMs each associate with respective multiple MEPs, the completion timer information may require a wide distribution. This can be seen, for example, from FIG. 4.

In the conventional version of FIG. 6, if an operation is successfully completed, then messages sent in S8 and S9 will occur, as shown in FIG. 6. In an embodiment of the present disclosure, the completion timer may expire before S8 is received at the MEO 310. If this is the case, then S9, rather than indicating a positive conclusion may inform the OSS 300 of a failure.

Given that there may be multiple entities required to finish their respective operations before the completion timer expires, there may not be a simple positive/negative outcome and a decision may be made on the number of successful completions provided by the entities concerned.

The attribute information is set out in Table 1 below. Note that all the attributes apart from completiontimer are conventional and defined in the relevant ETSI specification(s).

TABLE 1

Attributes of InstantiateAppRequest

| Attribute name | Cardinality | Data type | Description |
| --- | --- | --- | --- |
| AppInstanceId | 1 | String | Identifier of the application instance created by "Create application instance identifier" operation. |

TABLE 1-continued

Attributes of InstantiateAppRequest

| Attribute name | Cardinality | Data type | Description |
| --- | --- | --- | --- |
| VirtualComputeDescriptor | 0 . . . 1 | VirtualComputeDescription | Describes CPU, Memory and acceleration requirements of the virtual machine for the MEC application instance to be created. See note 1. |
| VirtualStorageDescriptor | 0 . . . N | VirtualStorageDescriptor | Defines descriptors of virtual storage resources to be used by the MEC application instance to be created. See note 1. |
| SelectedMECHostInfo | 1 . . . N | MECHostInformation | Describes the information of selected MEC host for the application instance. See notes 2 and 3. |
| locationconstraints | 0 . . . 1 | Locationconstraints | Defines the location constraints for the MEC application instance to be created. See note 4. |
| appTermCandsForCoord | 0 . . . 1 | AppTermCandsForCoord | Provides sets of applications as termination candidate alternatives that the MEO shall select from when utilising the coordinate LCM operation exchange in pre-emption situations (see step 3 in clause 5.3.1). If this attribute is omitted, the MEO shall make its own selection for the coordinate LCM operation exchange. See note 4. |
| completionTimer | 0 . . . 1 | Integer | Maximum duration in seconds for the server to complete the application instantiation. If the timer expires before application instantiation completion, the request is considered to have failed. If individual instantiations the server has identified to perform in response to the client's requested application instantiation have completed (e.g. all the individual application instantiations sent to MEPM(s) by the MEO in response to an instantiation request from the OSS), the request may be considered as partially failed. If present, overrides any preconfigured default at the server |

NOTE 1:
The same field of AppD will be overridden by the value of the field in this table.
NOTE 2:
This field applies to Mm3 reference point only.
NOTE 3:
This data type is not specified in the present document.
NOTE 4:
This field applies to Mm1 reference point only.

An important consideration are the actions which the server should take in response to the expiration of the completion time, for which there are various options, including the server rolling any state information relating to the application back to the state it was in prior to having received the request from the client. Such a rollback could include the server initiating the removal or deletion of resources associated with any successfully completed individual operations.

A further embodiment of the present disclosure provides the client with more detailed information on the progress of any ongoing operation at the server to the client. Through the availability of such information, one option is that the rollback decision can be left to the client, rather than the server immediately rolling the state back on timer expiry. On this basis, even though the operation state is FAILED, the application instantiation status can be considered to be INSTANTIATED so long as at least one of the server's subtask operations has completed, i.e., there is at least one successful instantiation at one particular host location.

In an alternative embodiment, the client can indicate to the server in the initial request that such roll back should be performed based on timer expiry and the client is simply informed that the requested operation had failed due to time expiry. The client could then choose how to proceed, e.g., re-attempt the request, potentially changing the requirements associated with the request to increase the likelihood of success.

Embodiments of the present disclosure provide that the location constraints of the individual application instantiations fulfilling the original application instantiation from the OSS 300 are made available in the AppInstanceInfo resource (as shown in Table 2, below) that is provided by the MEO/MEAO 310 and MEPM 320, through a new application location information element (appLocation). LocationConstraints is a pre-existing data type. This enables the client to discover location constraint information when querying the server for information relating to an individual application instance. Specifically, it enables the OSS 300 to discover where individual application instances have been deployed, to then make an assessment on deployment requirement fulfillment. Such information may also be made available to third party application providers via the Mx1 or Mx2 reference points, shown FIGS. 1 to 3, thereby providing them with greater insight into the deployment of their application. In an alternative embodiment, the application location information may also be provided as part of the resource representing the status of the application lifecycle management operation.

TABLE 2

Attributes of AppInstanceInfo

| Attribute name | Cardinality | Data type | Description |
|---|---|---|---|
| Id | 1 | String | Identifier of the application instance represented by this data type. |
| appInstanceName | 0 . . . 1 | String | Name of the application instance. |
| appInstanceDescription | 0 . . . 1 | String | Human-readable description of the application instance to be created. |
| appDId | 1 | String | The application descriptor identifier is managed by the application provider to identify the application descriptor in a globally unique way. It is copied from the AppD of the onboarded application package. |
| appProvider | 1 | String | The onboarded application package provider name. |
| appName | 1 | String | The onboarded application name. |
| appSoftVersion | 1 | String | The application software version. |
| appDVersion | 1 | String | Version of the application descriptor. |
| appPkgId | 1 | String | Identifier of the onboarded application package. |
| vimConnectionInfo | 0 . . . N | VimConnectioninfo | Information about VIM connections to be used for managing the resources for the application instance. See note 1 and 3. |
| nsInstanceId | 0 . . . 1 | String | Identifier of the NS instance created by NFVO in which the MEC application has been instantiated as a VNF instance. See note 2. |
| vnfInstanceId | 0 . . . 1 | String | Identifier of the VNF instance created by VNFM that the MEC application has been instantiated as. See note 2. |
| instantiationstate | 1 | Enum (inlined) | Instantiation state of the application instance: NOT_INSTANTIATED: the application instance is not instantiated. INSTANTIATED: the application instance has been instantiated. |
| instantiatedAppState | 0 . . . 1 | Structure (inlined) | Information specific to an instantiated application. This attribute shall be present if the instantiationstate attribute value is INSTANTIATED. |
| >operationalState | 1 | Enum (inlined) | Operational state is applicable in the instantiation state INSTANTIATED: STARTED: the application instance is up and running. STOPPED: the application instance stops operation. |
| >appLocation | 0 . . . N | LocationConstraints | List of location constraints of the instantiated MEC application, e.g. geographical (address, coordinates) or network topology based constraints. |
| communicationInterface | 0 . . . 1 | Communication Interface | Interface for communication with other application instances. See clause 7.5.2 of ETSI GS MEC021 for the data type definition. |
| _links | 1 | Structure (inlined) | Links to resources related to this resource. |
| >self | 1 | LinkType | Self referring URI. |
| >instantiate | 0 . . . 1 | LinkType | Link to the "instantiate" task resource, if the related operation is possible based on the current status of this application instance resource (i.e. application instance in NOT_INSTANTIATED state). See note 3. |
| >terminate | 0 . . . 1 | LinkType | Link to the "terminate" task resource, if the related operation is possible based on the current status of this application instance resource (i.e. application instance is in INSTANTIATED state). |

TABLE 2-continued

Attributes of AppInstanceInfo

| Attribute name | Cardinality | Data type | Description |
|---|---|---|---|
| >operate | 0 . . . 1 | LinkType | Link to the "operate" task resource, if the related operation is supported for this application instance, and is possible based on the current status of this application instance resource (i.e. application instance is in INSTANTIATED state). |
| >configure_platform_for_app | 0 . . . 1 | LinkType | Link to the "configure_platform_for_app" task resource, if the related operation is supported for this application instance, and is possible based on the current status of this application instance resource (i.e. application instance is in INSTANTIATED state). |

NOTE 1:
This field doesn't apply if the data structure is used on Mm1*.
NOTE 2:
This Field applies if the data structure is used on Mm3* or Mm1*.
NOTE 3:
This Field doesn't apply if the data structure is used on Mm3*.

A client may subscribe for notifications from the server on the status of ongoing operations (e.g., application instantiation, application termination, operation (start/stop instantiated application)), or directly query the server for updates. Embodiments of the present disclosure enhance the information available by providing fine grained information on the progress of the individual operations that the server has to perform in response to a client request. This is particularly important in the MEC system hierarchical architecture (as shown in FIG. 4), where the server may have to perform many operations in response to a single request from the client. For instance, the client may request application instantiation according to certain requirements, e.g., location constraints, where the server may have to perform many instantiations at different locations in order to fill that request. Critically, if the processing of the request from the client stalls at the server, or fails part way through, or doesn't complete within provided time bounds, it can provide the client with a far greater insight into a requested operation's progress. This enables the client to make more informed decisions on the appropriate next steps, such as, for instance, reattempting the operation, or triggering the rolling back of the state to where it was before originally triggering the operation.

The application instance LCM operation occurrence resource, which is created in response to operation request from the client, and which can be queried by the client, is provided in Table 3, below. Embodiments of the present disclosure add the appLcmOpStatus attribute. If the client has subscribed to notifications from the server related to the application instance LCM operation occurrence resource, the attributes of that notification are provided in Table 3: Attributes of AppLcmOpOcc. Once again the appLcmOpStatus attribute is provided. In an alternative embodiment, the appLcmOpStatus attribute could also be added to the AppInstanceInfo of Table 2, above. The AppLcmOpStatus data type, set out herein, representing the parameters relating to the status of an application LCM operation, is provided in Table 4, below: Attributes of AppLcmOpOccNotification. Further attributes could be added to this data type to provide even more information, for instance, location constraints relating to the application instantiations.

TABLE 3

Attributes of AppLcmOpOcc

| Attribute name | Cardinality | Data type | Description |
|---|---|---|---|
| Id | 1 | String | Identifier of the subscription to application LCM operation occurrence notification. |
| operationstate | 1 | Enum (inlined) | Operation state:<br>STARTING: the LCM operation starting.<br>PROCESSING: the LCM operation is currently in execution.<br>COMPLETED: the LCM operation has been completed.<br>FAILED: The LCM operation has failed.<br>Additional states which may be used in certain embodiments, such as:<br>ABORTING: the LCM operation is being aborted.<br>ABORTED: the LCM operation has been aborted.<br>PAUSED: the LCM operation is paused.<br>REVERTING: the LCM operation is being reverted. |

TABLE 3-continued

Attributes of AppLcmOpOcc

| Attribute name | Cardinality | Data type | Description |
| --- | --- | --- | --- |
| | | | REVERTED: the LCM operation has been reverted. PARTIALLY_COMPLETE: the LCM operation has been partially completed. |
| stateEnteredTime | 1 | TimeStamp | Date and time when the current state was entered. |
| startTime | 1 | TimeStamp | Date and time of the start of the operation. |
| lcmOperation | 1 | Enum (inlined) | Type of the actual LCM operation represented by this application instance LCM operation occurrence: INSTANTIATE. OPERATE. TERMINATE. This attribute is associated to the operationParams. |
| operationParams | 0 . . . 1 | InstantiateAppRequest OR OperateAppRequest OR TerminateAppRequest | Input parameters of the LCM operation. This attribute shall be formatted according to the request data type of the related LCM operation. The following mapping between LCM operation and the data type of this attribute shall apply: INSTANTIATE: InstantiateAppRequest. OPERATE: OperateAppRequest. TERMINATE: TerminateAppRequest. This attribute shall be present if this data type is returned in a response to reading an individual resource. See note. |
| appLcmOpStatus | 0 . . . 1 | AppLcmOpStatus | Provides finer granularity detail on the progress of the current application LCM operation. See TABLE 5. |
| _links | 1 | Structure (inlined) | Links to resources related to this resource. |
| >self | 1 | LinkType | URI of this resource. |
| >appInstance | 1 | LinkType | Link to the application instance that the operation applies to. |

NOTE:
This object contains structured data, and shall comply with the provisions of clause 4 of IETF RFC 8259

TABLE 4

Attributes of AppLcmOpOccNotification

| Attribute name | Cardinality | Data type | Description |
| --- | --- | --- | --- |
| id | 1 | String | Identifier of this notification. If a notification is sent multiple times due to multiple subscriptions, the "notificationId" attribute of all these notifications shall have the same value. |
| notificationType | 1 | Enum (inlined) | Discriminator for the different notification types: STARTING: the LCM operation starting. PROCESSING: the LCM operation is currently in execution. COMPLETED: the LCM operation has been completed. FAILED: The LCM operation has failed. Additional states which may be used in certain embodiments, such as: ABORTING: the LCM operation is being aborted. ABORTED: the LCM operation has been aborted. PAUSED: the LCM operation is paused. REVERTING: the LCM operation is being reverted. REVERTED: the LCM operation has been reverted. PARTIALLY_COMPLETE: the LCM operation has been partially completed. |

TABLE 4-continued

Attributes of AppLcmOpOccNotification

| Attribute name | Cardinality | Data type | Description |
| --- | --- | --- | --- |
| subscriptionId | 1 | String | Identifier of the subscription to this notification. |
| timeStamp | 1 | TimeStamp | Date and time of the notification generation. |
| appLcmOpOccId | 1 | String | Identifier of application lifecycle management operation occurrence. |
| appLcmOpStatus | 0 . . . 1 | AppLcmOpStatus | Provides finer granularity detail on the progress of the current application LCM operation. See TABLE 5. |
| appInstanceId | 1 | String | Identifier of application instance. |
| _links | 1 | Structure (inlined) | Links to resources related to this notification. |
| >appInstance | 1 | LinkType | Link to the resource representing the application instance to which the notified change applies. |
| >subscription | 1 | LinkType | Link to the related subscription. |
| >appLcmOpOcc | 1 | LinkType | Link to the application lifecycle management operation occurrence that this notification is related to. |

TABLE 5

Attributes of AppLemOpStatus

| Attribute name | Cardinality | Data type | Description |
| --- | --- | --- | --- |
| totalOperations | 1 | Integer | Total individual operations the server has identified to perform in response to a client request, e.g. total number of individual application instantiation requests planned to be sent to MEPM(s)/MEPM-V(s) by the MEO in response to an instantiation request from the OSS, or total number of individual configuration requests planned to be sent to MEC platforms by a MEPM/MEPM-V in response to an instantiation request from the MEO/MEAO. |
| performedOperations | 1 | Integer | Individual operations the server has performed out of the totalOperations to complete. |

Table 5 provides example information elements related to the finer granularity detail on the progress of the current application LCM operation. Other information elements could include the location constraint(s) of the instantiated application instance(s). The motivation for the AppLcmOpStatus data type is to provide more fine grained insight into the progress of an ongoing task or tasks at the server, rather than high level coarse grained indication of just started, progressing and completed.

Figure 8:
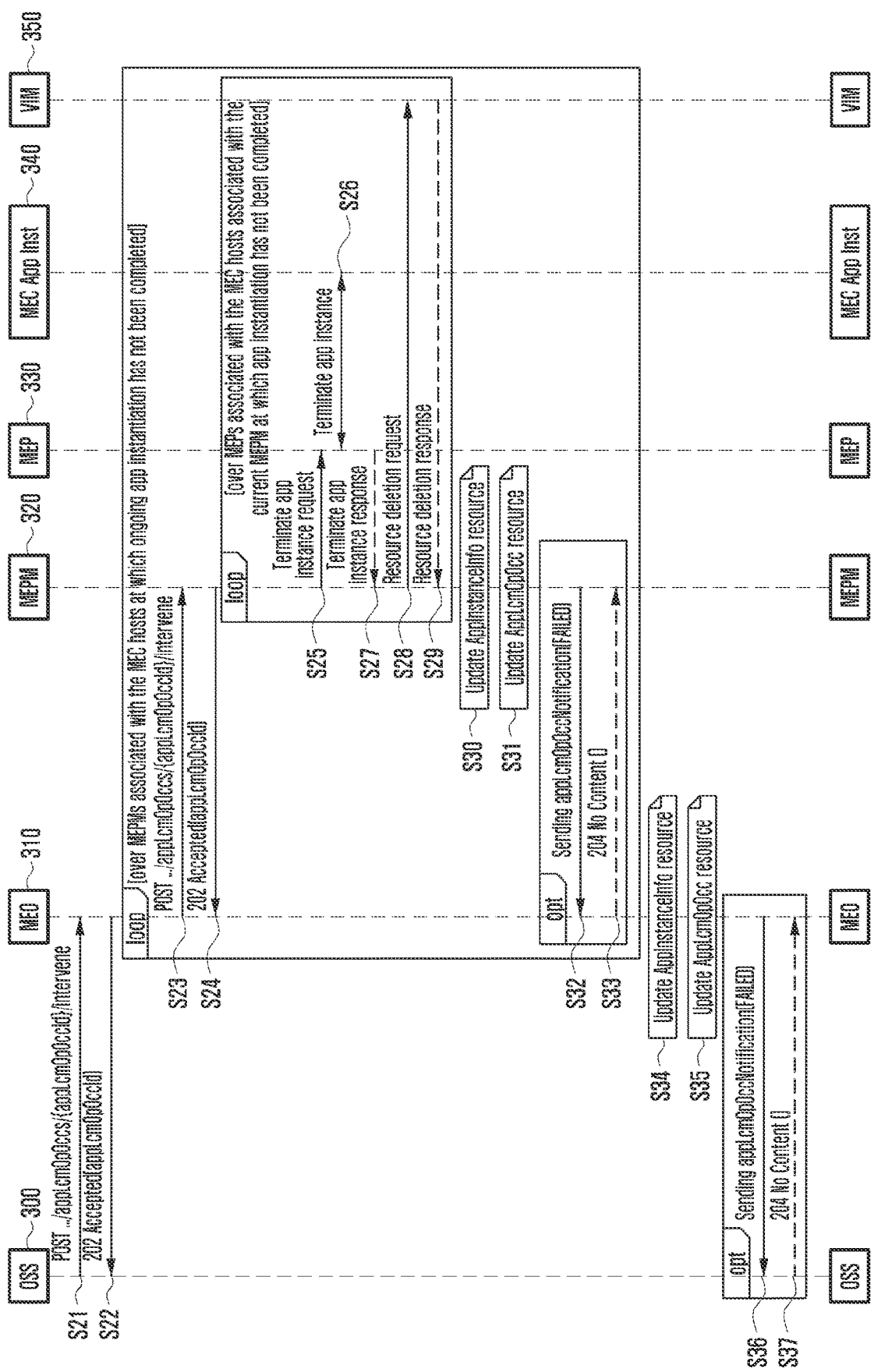
FIG. 8 shows an application instantiation operation intervention process according to an embodiment of the present disclosure.

Embodiments of the present disclosure provide an intervention request that can be made to an ongoing application instantiation operation, which enables the client to intervene in that operation. The intervention request may be initiated by the client if, for example, the server is deemed to be making insufficient progress. A specific embodiment of this, in terms of signal flow, is illustrated in FIG. 8. The network entities illustrated correspond to those shown in FIGS. 6 and 7.

FIG. 8 shows an application instantiation operation intervention process according to an embodiment of the present disclosure.

In FIG. 8, there are 2 separate loop operations defined. The first iterates steps S23-S33, with a further embedded loop for steps S25-S29. These loops are required to accommodate possible multiple MEPMs 320 and MEPs 330 respectively.

The application instantiation operation intervention process, according to the embodiment illustrated in FIG. 8, comprises the following steps:

In Step 21, the OSS 300 sends an intervene request to the application instance LCM operation occurrence resource at the MEO 310. The request indicates the required action, for example pause, rollback or abort the ongoing operation. In this particular embodiment, the action is an abort and the operation is application instantiation. However, the general approach is applicable to any intervention request action and any application lifecycle management operation, e.g., application onboarding, instantiation, termination, starting or stopping, and so the specific examples are not intended to be limiting.

In Step 22, the MEO 310 returns a 202 Accepted response with an empty payload body and a Location HTTP header that points to the application instance LCM operation occurrence resource. Alternatively, the MEO 310 will create a dedicated resource for the intervene operation and instead pass the URI of that in the Location header, allowing the OSS 300 to monitor the specific intervene task.

Steps 23-33 are performed for each MEPM 320 associated with the MEC hosts at which ongoing application instantiation has not been completed.

In Step 23, the MEO 310 sends an intervene request to the application instance LCM operation occurrence resource at the MEPM 320. The request indicates the required action, for example pause, rollback or abort the ongoing operation (specifically "abort" in the present example).

In Step 24, the MEPM 320 returns a 202 Accepted response with an empty payload body and a Location HTTP header that points to the application instance LCM operation occurrence resource. Alternatively, the MEPM 320 will create a dedicated resource for the intervene operation and instead pass the URI of that in the Location header, allowing the MEO 310 to monitor the specific intervene task.

The required action in the intervene request will dictate the specific actions the server is expected to take. In the case of a request to abort the ongoing operation, completed instantiations could be retained whilst any resources reserved for incomplete instantiations could be deleted or removed. Alternatively, since the original instantiation request hasn't completed successfully, the decision could be made to perform a rollback to take the system back to the state prior to the original instantiation request from the OSS. Whilst the required action is being performed, that could be reflected by the operation state of the application instance LCM operation occurrence resource. For example, indicating the state as ABORTING during the processing of the requested abort action, or PAUSED on receiving an intervention with pause as the requested action. Once the requested intervention action has completed, the state may reflect that. For example, ABORTED after a requested abort action. A paused operation would remain in PAUSED state until a further action was requested such as resume.

Steps 25-31 are performed for each MEP 330 associated with the MEC hosts associated with the current MEPM at which app instantiation has not been completed.

In Step 25, since the instantiation has not completed successfully, the MEPM 320 indicates to the MEP 330 to forcefully terminate application instance request.

In Step 26, the MEC platform 330 will then shut down the application 340.

The MEC 330 platform sends a terminate application instance response to the MEC platform manager 320.

In Step 27, the MEP 330 provides a terminate app instance response.

In Step 28, the MEC platform manager 320 sends a resource deletion request to the corresponding virtualization infrastructure manager 350, to terminate the virtualization container and release the resources.

In Step 29, the virtualization infrastructure manager 350 releases the resources allocated for the application instance 340. It then sends resource a deletion response to the MEC platform manager 320.

In Step 30, if at least one subtask operate is complete, transition application instantiation state is INSTANTIATED (from NOT_INSTANTIATED) and application operational state is STARTED (of this MEPM's AppInstanceInfo resource). If no subtask operate is complete, application instantiation state remains as NOT_INSTANTIATED (of this MEPM's AppInstanceInfo resource), in which case the application operational state is not applicable.

In Step 31, the transition operation state (of this MEPM's AppLcmOpOcc resource) is changed to FAILED.

In Step 32, the transition to FAILED state will trigger a notification to subscribers of such application LCM operation occurrence events, e.g., the MEO 310.

In Step 33, subscribers the notification will respond with a 204 No Content.

In Step 34, if at least one subtask operation is complete, a transition is performed from application instantiation state to INSTANTIATED (from NOT_INSTANTIATED) and application operational state to STARTED (of the MEO's AppInstanceInfo resource). If no subtask operation is complete, application instantiation state remains as NOT_INSTANTIATED (of the MEO's AppInstanceInfo resource), in which case the application operational state is not applicable.

In Step 35, operation state (of the MEO's AppLcmOpOcc resource) transitions to FAILED.

In Step 36, the transition to FAILED state will trigger a notification to subscribers of such application LCM operation occurrence events, e.g., the OSS 300.

In Step 37, subscribers receiving the notification will respond with a 204 No Content message.

Accordingly, active steps to terminate an application instantiation operation can be taken for the reasons set out above.

As can be seen from the above, various means are provided to improve the operation a MEC system. These means may be operated independent of each other tor in unison. It is not necessary to operate them together as advantages will be realized by their independent use, but use of multiple means will result in greater improvements.

Accordingly, a method is provided for performing an application lifecycle related operation request in a MEC system, with the method providing a completion timer as part of the request. In an embodiment, the request is sent from an OSS to an MEO, from the MEO to at least one MEPM and from the at least one MEPM to at least one MEP. It should be noted that the request may change form as it is transmitted from entity to entity but, in substance, constitutes a request to perform some activity or other, each of said activities being traced back to the original request.

The completion timer is monitored by the MEO and by the at least one MEPM. In an embodiment, the operation is performed on at least one application instance.

The operation is performed on a plurality of application instances and successes, with failure or partial failure being reported to another MEC system entity by signaling or subscription, such that the other MEC system entity can take further action at least based on partial failure. For instance, failure or partial failure is reported to the OSS or the MEO by signaling or subscription, such that the OSS or MEO can take further action in the result of at least partial failure, since the MEPM can report to the MEO. Further, in the event of a federation, the MEO of one system can report to the MEO of another system, with both systems being part of the overall MEC system.

Also provided is, a MEC system comprising at least one server and at least one client, a method of the at least one server for providing fine-grained information on a task triggered by an application lifecycle related operation request from the at least one client. The fine-grained information is one of information on the task from a network entity more than one layer away in a hierarchical system; information on the task from a network entity more than one step away in a federated system; or information related to geographical or network topology.

In a hierarchical system, an OSS receives fine-grained information from an MEPM or an MEP; or an MEO receives fine-grained information from an MEP; or, in a federated system, an MEO in a first system receives fine-grained information from a Federation manager.

The fine-grained information comprises one or more of a number of individual application operations completed by the server and a total number of individual application operations to complete by the server as a result of the client request.

The fine-grained information is made available to third parties by means of the MEC System's external interface.

Also provided is an MEC system that includes at least one server and at least one client, the at least one client intervening in an ongoing application lifecycle related operation at the least one server. The intervention results in a modification of at least one task associated with the ongoing operation, and the intervention includes one of pause, resume, rollback or abort. The at least one client either subscribes to be notified of a result of the intervention or directly queries the server.

An operation state is updated to reflect the intervention status while the intervention is in progress and again once completed.

The application lifecycle related operation includes one of onboarding, instantiating, terminating, starting, and stopping.

In addition, the first, second and third aspects may be combined in any combination, to yield further advantages. One of ordinary skill in the art will appreciate that the use of any aspect alone will produce improvements over conventional systems and use of using two or more of the aspects together will yield still greater improvements. That is, if the completion timer of the first aspect is implemented together with the fine-grained information, an intervention of the third aspect may be initiated as a result. As such, the overall performance of the MEC system is improved.

Also, information exchanges over the Mm1, Mm3, Mm3*, Mfm-fed and Mff-fed reference points (plus Mfb-fed in the case a MEC Federation Broker is employed between MEC Federation managers) are augmented to provide the client entity with a finer grained information on initiated operation progress at the server and to enable the client the option to time bound operations, i.e., impose temporal limitations upon the operations.

Enhanced application lifecycle management is provided that is particularly applicable in a hierarchical architecture, where the server to a client higher in the hierarchy becomes a client to a server lower in the hierarchy. When such hierarchy exists, clients higher in the hierarchy may lack insight into the progress of task related operations issued to the server they directly interact with, when such tasks have a dependence on servers lower in the hierarchy. A completion time is supplied with task related requests.

For the completion timer, operations such as application instantiation, which in the MEC system are invoked via a RESTful interface, trigger processing tasks in the underlying system that may take a long time, from minutes to hours or even days to complete. A completion time in a resource constrained environment, such as that at a network edge, may offer the server the opportunity to defer initiating tasks if it is aware that the necessary resources (e.g., CPU, GPU, memory and storage) are not currently available, but may be in the future, prior to the completion timer expiring. Servers supply fine grained information on tasks triggered by a client request and deployment insights.

An operation such as single application instantiation requested by an OSS may trigger instantiation tasks at more than one hosting location, which the OSS wouldn't otherwise have insight into. This is also the case for an application instantiation issued by the MEO towards the MEPM, or towards a MEC Federation manager in the case of a federation of MEC systems. The fine-grained information could also include locations at which instantiations have taken place. An intervention mechanism is provided, such that a client can intervene in an ongoing server operation.

If a client deems that progress of an operation at a server is insufficient, the client can intervene to pause, rollback or abort an ongoing operation. Such fine-grained information that could be made available to the client to help facilitate a client decision, based on the progress indicated by the server. Any intervention would not have to be coupled to the completion time. For example, the client could intervene even whilst the timer was running, for instance if there was an application update that needed to be pushed before an instantiation had completed.

In the ETSI MEC standard, requests can be issued for certain operations that trigger processing tasks in the underlying system that may take a long time, from minutes to hours or even days. No mechanism exists to allow the client to provide a maximum duration to the server to complete such operations, or for a client to intervene in an ongoing server operation should it deem (for instance that) progress to be insufficient. Furthermore, the ETSI MEC standard does not support mechanisms to provide the client with fine grained information on the subtasks triggered at the server in relation to a task issued to the server by the client. Currently, the only option is for the server to provide indication that an operation has completed or has failed.

Significant benefits are provided in systems in which each entity in the system may be offered by a different provider, whether that be the equipment provider or the operator of the system (as in the case of a third party MEC/edge compute service provider, or a federation of MEC systems).

Mechanisms are provided for a client to provide the expected completion time of task operations it issues towards a server. This is particularly important in a hierarchal architecture where at each level in the hierarchy multiple subtasks may be triggered as a result of a request task operation from a higher level in a hierarchy and the time taken to complete each such subtask may vary significantly. Providing an expected completion time also provides flexibility for the server to issue such subtasks at a time, within the completion window period, such that the probability of the successful completion of such a subtask is higher.

Also provided is for a server to offer more fine grained information on the status of the individual subtasks (e.g., how many have completed out of the total attempting to be performed, or at what locations subtasks have completed) to the client to enable the client to make more informed decisions regarding potential actions, such as termination or cancelling of an operation if progress is deemed insufficient or too slow. Further, the client is able to intervene in an ongoing operation, to for instance pause or abort an ongoing task.

Embodiments of the present disclosure have been described in the context of application lifecycle management operation. However, it is equally applicable to the process of onboarding an application package, which utilizes the interfaces highlighted in the present disclosure, namely Mm1, Mm3, Mm3*, Mfm-fed and Mff-fed (plus Mfb-fed in the case a MEC Federation Broker is employed between MEC Federation managers).

Embodiments of the present disclosure offer significant enhancement to the current application lifecycle management procedures offered by the ETSI MEC standard, which will be further realized as the MEC Federation concept is specified. Such enhancements are of utility in a MEC system to enhance interoperability where application providers, equipment vendors, the edge service provider and the communications provider may all be separate independent entities.

The present disclosure comprises a number of aspects and each of these may be implemented independent of the others, combined with one or more of the others or combined will of the others. The skilled person will appreciate that any one aspect will offer advantages over conventional systems and that greater advantage will be observed by the use of more than one aspect.

In all the above descriptions of particular attribute or data types, the names or labels provided are exemplary only and the skilled person will readily appreciate that the particular name chosen is not intended to be limiting.

At least some of the example embodiments described herein may be constructed, partially or wholly, using dedicated special-purpose hardware. Terms such as component, module or unit used herein may include, but are not limited to, a hardware device, such as circuitry in the form of discrete or integrated components, a field programmable gate array (FPGA) or application specific integrated circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term comprising or comprises means including the component(s) specified but not to the exclusion of the presence of others.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed herein, including any accompanying claims, abstract and drawings, may be replaced by alternative features serving the same, equivalent or similar purpose, unless expressly stated otherwise. Thus, unless expressly stated otherwise, each feature disclosed is one example only of a generic series of equivalent or similar features.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method for managing an application instance by a multi-access edge computing orchestrator (MEO) in a multi-access edge computing (MEC) system, the method comprising:

receiving, from an operational support system (OSS), an application instantiation request including a completion timer in which to finish the application instantiation request;

selecting at least one MEC platform manager (MEPM) for the application instantiation request;

transmitting, to the selected MEPM, the application instantiation request; and transmitting, to the OSS, a response indicating that application instantiation has failed, in case that the completion timer expires before receiving a configuration response from the selected MEPM.

2. The method of claim 1, wherein the application instantiation request further comprises an application instant identifier (ID).

3. The method of claim 1, further comprising:

transmitting, to the OSS, the configuration response from the selected MEPM before the completion timer expires, wherein the configuration response indicates success or failure of the application instantiation.

4. The method of claim 1, further comprising:

receiving, from the OSS, an intervene request to an application instance lifecycle management (LCM) operation occurrence; and transmitting, to the OSS, a response indicating acceptance of the intervene request.

5. The method of claim 1, further comprising:

receiving, from the OSS, a request to subscribe to a notification about a status of ongoing operation;

transmitting, to the OSS, fine grained information on the status of the ongoing operation.

6. The method of claim 5, wherein the fine grained information includes at least one location constraint.

7. The method of claim 5, wherein the status of ongoing operation comprises at least one of the application instantiation, application termination, and operation of the application.

8. A multi-access edge computing orchestrator (MEO) for managing an application instance in a multi-access edge computing (MEC) system, the MEO comprising:

a transceiver configured to transmit and receive a signal or a message;

a memory; and at least one processor configured to:

receive, from an operational support system (OSS), an application instantiation request including a completion timer in which to finish the application instantiation request;

select at least one MEC platform manager (MEPM) for the application instantiation request;

transmit, to the selected MEPM, the application instantiation request; and transmit, to the OSS, a response indicating that application instantiation has failed, in case that the completion timer expires before receiving a configuration response from the selected MEPM.

9. The MEO of claim 8, wherein the application instantiation request further comprises an application instant identifier (ID).

10. The MEO of claim 8, wherein the at least one processor is further configured to transmit, to the OSS, the configuration response from the selected MEPM before the completion timer expires, wherein the configuration response indicates success or failure of the application instantiation.

11. The MEO of claim 8, wherein the at least one processor is further configured to:

receive, from the OSS, an intervene request to an application instance lifecycle management (LCM) operation occurrence; and transmit, to the OSS, a response indicating acceptance of the intervene request, wherein the intervene request indicates one of cancel, retry and fail.

12. The MEO of claim 8, wherein the at least one processor is further configured to:

receive, from the OSS, a request to subscribe to a notification about a status of ongoing operation;

transmit, to the OSS, a fine grained information on the progress of the individual operations for which subscription.

13. The MEO of claim 12, wherein the fine grained information includes at least one location constraint.

14. The MEO of claim 12, wherein the status of ongoing operation comprises at least one of the application instantiation, application termination, and operation of the application.

* * * * *